United States Patent
Shapiro

(10) Patent No.: US 9,015,353 B2
(45) Date of Patent: Apr. 21, 2015

(54) METHOD AND SYSTEM FOR HYBRID DIRECT INPUT/OUTPUT (I/O) WITH A STORAGE DEVICE

(71) Applicant: Michael W. Shapiro, San Francisco, CA (US)

(72) Inventor: Michael W. Shapiro, San Francisco, CA (US)

(73) Assignee: DSSD, Inc., Menlo Park, CA (US)

( * ) Notice: Subject to any disclaimer, the term of this patent is extended or adjusted under 35 U.S.C. 154(b) by 0 days.

(21) Appl. No.: 13/827,086

(22) Filed: Mar. 14, 2013

(65) Prior Publication Data

US 2014/0279988 A1 Sep. 18, 2014

(51) Int. Cl.
G06F 3/00 (2006.01)
G06F 13/00 (2006.01)
G06F 13/14 (2006.01)
G06F 3/06 (2006.01)
G06F 17/30 (2006.01)

(52) U.S. Cl.
CPC ........ G06F 3/0643 (2013.01); G06F 17/30091 (2013.01)

(58) Field of Classification Search
None
See application file for complete search history.

(56) References Cited

U.S. PATENT DOCUMENTS

| | | | |
|---|---|---|---|
| 8,285,682 B2 * | 10/2012 | Oza | 707/646 |
| 8,301,832 B1 * | 10/2012 | Moore et al. | 711/103 |
| 8,312,356 B1 * | 11/2012 | Cousins | 714/781 |
| 2005/0198624 A1 * | 9/2005 | Chipman | 717/146 |
| 2006/0031833 A1 * | 2/2006 | Huang et al. | 717/178 |
| 2006/0294059 A1 * | 12/2006 | Chamberlain et al. | 707/3 |
| 2007/0283324 A1 * | 12/2007 | Geisinger | 717/120 |
| 2008/0189512 A1 * | 8/2008 | Hansen et al. | 712/1 |
| 2009/0112879 A1 * | 4/2009 | Oliveira et al. | 707/10 |
| 2009/0271581 A1 * | 10/2009 | Hinrichs, Jr. | 711/162 |
| 2010/0011128 A1 * | 1/2010 | Paycher et al. | 710/1 |
| 2010/0174745 A1 * | 7/2010 | Ryan et al. | 707/770 |
| 2011/0238715 A1 * | 9/2011 | Quinn et al. | 707/822 |
| 2011/0320479 A1 * | 12/2011 | Burris et al. | 707/769 |
| 2012/0151472 A1 * | 6/2012 | Koch et al. | 718/1 |
| 2013/0239129 A1 * | 9/2013 | Kim | 719/320 |
| 2013/0304778 A1 * | 11/2013 | Vanderhallen et al. | 707/831 |
| 2014/0108755 A1 * | 4/2014 | Lue et al. | 711/162 |

* cited by examiner

Primary Examiner — Henry Tsai
Assistant Examiner — Christopher Bartels
(74) Attorney, Agent, or Firm — Osha • Liang LLP

(57) ABSTRACT

A method including intercepting a OFR for a file issued by an application to a FS, forwarding the OFR to the FS, receiving from the FS a FD for the file, issuing a SR for the file to the FS. The further method includes receiving from the FS status information for a target device on which the file is located, where the status information includes an OID for the file, storing a mapping of FD to the OID, intercepting a first FOR for the file, making a determination the that the first FOR is one of a read request and a write request, based on the determination, making another determination that the target device supports the direct I/O protocol, and issuing a DI request to the target device using the OID for the file, where the DI request is not processed by the FS.

14 Claims, 5 Drawing Sheets

METHOD AND SYSTEM FOR HYBRID DIRECT INPUT/OUTPUT (I/O) WITH A STORAGE DEVICE

BACKGROUND

File systems are typically used to manage the interaction between applications and the data used by the applications. In particular, file systems provide applications with a common interface through which the applications can access data without requiring the applications to understand how the data is stored on the storage device. The processing of requests from the applications by the file system typically introduces latency that may impact the operation of the applications.

SUMMARY

In general, in one aspect, the invention relates to a non-transitory computer readable medium comprising instructions, which when executed by a processor perform a method. The method includes intercepting, in a user-level of a host, an open file request (OFR) for a file issued by an application to a file system (FS), forwarding the OFR to the FS, wherein the FS is located in the user-level and the OFR is forwarded to the FS via a kernel module in a kernel-level of the host, receiving from the FS, in response to the OFR, a file descriptor (FD) for the file, issuing a status request (SR) for the file to the FS, wherein the SR comprises the file descriptor, receiving from the FS, in response to the SR, status information for a target device on which the file is located, wherein the status information comprises an object identified (OID) for the file, storing a mapping of FD to the OID, after storing the mapping of the FD to the OID: intercepting a first file operation request (FOR) for the file, wherein the request comprises the FD, making a first determination the that the first FOR is one selected from a group consisting of a read request and a write request, based on the first determination, making a second determination that the target device on which the file is located supports the direct I/O protocol, and issuing a direct I/O request to the target device using the OID for the file, wherein the direct I/O request is not processed by the FS.

In general, in one aspect, the invention relates to a system. The system includes a processor, a user-level comprising an application, a direct I/O library, and a file system (FS), and a kernel-level, executing on the processor, comprising a kernel module, wherein the application is configured to issue an open file request (OFR) for a file, wherein the direct I/O library is configured to intercept the OFR and forward the OFR to the kernel module, wherein the kernel module is configured to forward the OFR to the FS, wherein the FS is configured to obtain a file descriptor (FD) for the file and send the FD to the direct I/O library via the kernel module, wherein the direct I/O library is further configured to issue a status request (SR) for the file to the FS, wherein the SR comprises the file descriptor, wherein the FS is configured to receive, via the kernel module, the SR and generate status information for a target device on which the file is located, wherein the status information comprises an object identified (OID) for the file and specifies that the target device supports a direct I/O protocol, and send the status information to the direct I/O library via the kernel module, wherein the direct I/O library is further configured to receive the status information and store a mapping of FD to the OID, and wherein the target device is operatively connected to the system.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to enabling an application executing in the user-level to interact with a storage device using two different mechanisms—(i) via a user-level file system and (ii) directly with the storage device where the user-level file system is bypassed. This hybrid approach allows applications to use a file system when performing certain types of file operation requests (FORs) and open file requests (OFRs) via the user-level file system while performing other types of FORs without involving the file system. In this manner, the latency typically introduced using the user-level file system may be mitigated by only using the user-level file system when it is not possible to service the FOR directly with the storage device.

Figure 1:
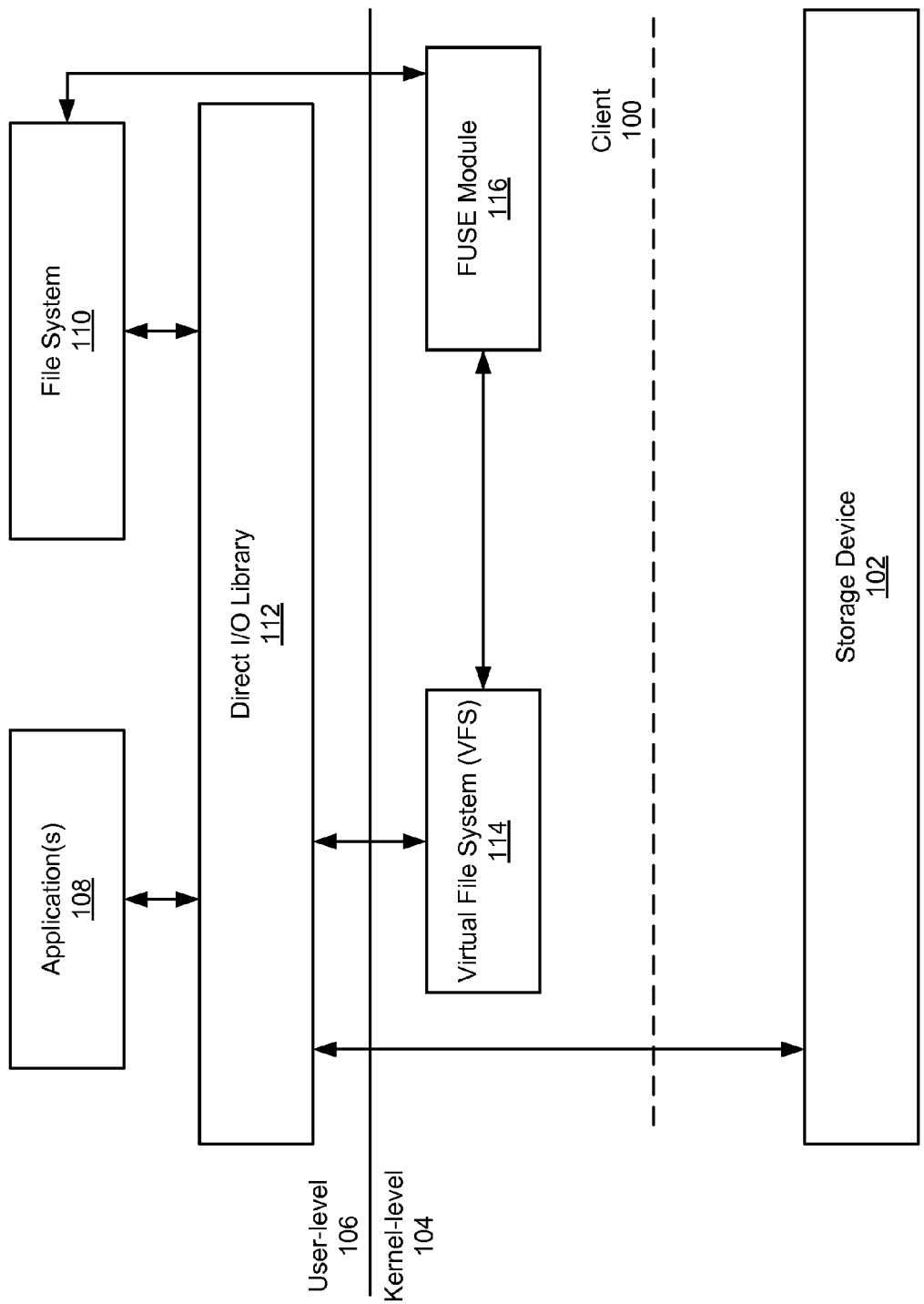
FIG. 1 shows a system in accordance with one or more embodiments of the invention.

FIG. 1 shows a system in accordance with one or more embodiments of the invention. The system includes one or more clients (100) connected to one or more storage devices (102) via one or more physical connections (not shown). Each of these components is described below.

In one embodiment of the invention, the client (100) is any physical system that includes functionality to issue I/O requests (e.g., a request to read data, a request to write data) to the storage device (102). In one embodiment of the invention, the client (100) may include a processor (not shown), memory (not shown), and persistent storage (not shown).

The client (100) is configured to execute an operating system (OS) that includes a kernel-level (104) and a user-level (106). The kernel-level (104) includes the main components of the OS. These components enable applications (108) executing in the user-level to interact with the hardware level of the client (not shown). In contrast, the user-level (106) is an operating environment on which applications (108) and user-level file systems (110) can execute. The applications (108) and user-level file systems (110) do not interact directly with the hardware of the client; rather, the interaction of the applications (108) and user-level file systems (110) with the hardware on the client is controlled by the kernel-level (104).

In one embodiment of the invention, a file system (110) provides a mechanism for the storage and retrieval of files from the storage device(s) (102). More specifically, the file system stores information provided by the user (i.e., data) and information describing the characteristics of the data (i.e., metadata). The file system also provides programming interfaces to enable the creation and deletion of files, reading and writing of files, performing seeks within a file, creating and deleting directories, managing directory contents, etc. In addition, the file system also provides management interfaces to create and delete file systems. In one embodiment of the invention, to access a file, the operating system (via the file system) typically provides file manipulation interfaces to open, close, read, and write the data within each file and/or to manipulate the corresponding metadata.

Continuing with the discussion of FIG. 1, the user-level also includes a direct I/O library (DI Lib) (112). The DI Lib is interposed between (i) the application(s) (108) and the VFS (114), (ii) application(s) (108) and the storage device(s) (102), and (iii) the user-level file system (110) and the storage device(s) (102). In general, the DI Lib (112) is configured to intercept OFRs and FORs from the application(s) and determine whether to forward such requests for the user-level file system (110) (via the kernel-level) or to process the request in accordance with FIG. 4A. Further, the DI Lib (112) also provides an interface through with the user-level file system (110) may interact with the storage device(s) (102). For example, the user-level file system (112) may service requests received from the application(s) by sending a request to storage device via the DI lib (112). Additional details about the operation of the DI Lib (112) are described below with respect to FIGS. 2-4B.

Though not shown in FIG. 1, the DI Lib (112) may include both a user-level component (112 in FIG. 1) and kernel-level component (not shown). The kernel-level component includes functionality to setup (or initiate the setup of) the client (100) and the storage device(s) (102) to enable them to communicate using the direct I/O protocol. This may include allocating (or initiating the allocation of) submission and completions queues in the memory (not shown) of the storage device and to configure (or initiate the configuration of) the storage device (or components therein) to enable communication between the client and the storage device. Once the aforementioned setup/configuration is complete, the kernel-level component provides the DI Lib (112) with the handles to the submission and completion queues.

In one embodiment of the invention, the kernel-level components of the DI Lib map the submission and completion queues to the client address space. Once the mapping is complete, there is a single unified address space that bridges the memory in the client and the memory in the storage device (discussed below).

The unified address space allows the application to directly store the DI requests (see FIG. 4A) in the appropriate submission queue without requiring any context switching. More specifically, the DI Lib may issue a DI request(s) to the storage controller in the storage device. The DI request is subsequently received by the storage controller and stored in a memory address in the unified address space corresponding to a location in the submission queue. More specifically, the aforementioned memory address is mapped to a location in the memory of the storage device that corresponds to a location in submission queue. For example, if the submission queue is implemented as a ring buffer, then the location in the memory may be the location of the tail of the ring buffer. In one embodiment of the invention the unified address space discussed above is implemented using PCIe and non-transparent bridging. Other mechanisms for implementing a unified address space may be used without departing from the invention.

Continuing with the discussion of FIG. 1, in one embodiment of the invention, the virtual file system (VFS) (114) is kernel-level component that provides an interface between application(s) (108) and one or more file systems on the client. Accordingly, from the perspective of the application(s) (108) the VFS appears as the file system with which the application is interacting. As shown in FIG. 1, the VFS (114) interacts with the FUSE module (116). From the perspective of the VFS (114), the FUSE module (116) is a file system and is treated as such. However, the FUSE module (116), like the VFS (114), is another interface through which requests are passed. Specifically, the FUSE module (116) enables the VFS (114) to communicate with the user-level file system (110). Many operating systems provide a mechanism for a filesystem (e.g., 110) to execute in userspace. For purposes of this discussion, the term FUSE is used to refer to this mechanism, as that is the name of one widely used implementation. However, those skilled in the art will appreciate that the invention is not limited to the filesystem in USerspacE (FUSE) implementation in Linux; rather, the invention may be implemented using any mechanism that includes sufficient functionality to implement the FUSE Model (116). Ultimately, the combination of the VFS (114) and the FUSE module (116) enable the user-level file system (110) to receive requests from the application(s) (108) without the application(s) (108) being aware that the file system with which the application is interacting is the user-level file system (110) executing in the same user-level as the application(s) (108).

Continuing with the discussion of FIG. 1, the storage device(s) (102) includes a storage controller (not shown), memory (not shown), and a storage array (not shown). Each of these components is described below.

In one embodiment of the invention, the storage controller is configured to implement various embodiments of the invention including, but not limited to, (i) creating submission queues and completion queues in its memory, (ii) queuing I/O requests; (iii) processing queued I/O requests in the submission queues, and (iv) notifying the client that an I/O request has been completed via the completion queues. In one embodiment of the invention, the storage controller includes a processor (not shown) configured to execute instructions to implement one or more embodiments of the invention, where the instructions are stored on a non-transitory computer readable medium (not shown) that is located within or that is operatively connected to the storage controller. Alternatively, the storage controller may be implemented using the integrated circuit including circuits configured to provide the aforementioned functionality. Alternatively, the storage controller may be implemented using an FPGA, an ASIC, other specialized hardware or any combination thereof. The storage controller may be implemented using any combination of software and/or hardware without departing from the invention.

In one embodiment of the invention, the storage array includes one or more persistent storage devices including, but not limited to, magnetic memory devices, optical memory devices, solid state memory devices, phase change memory devices, any other suitable type of persistent memory device, or any combination thereof.

In one embodiment of the invention, the client (100) is configured to communicate with the storage device using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. The invention is not limited to the aforementioned protocols.

System configurations other than the one shown in FIG. 1 may be used without departing from the invention.

FIGS. 2-4B show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, one or more steps shown in FIGS. 2-4B may be performed in parallel with one or more of the other steps shown in FIGS. 2-4B.

Figure 2:
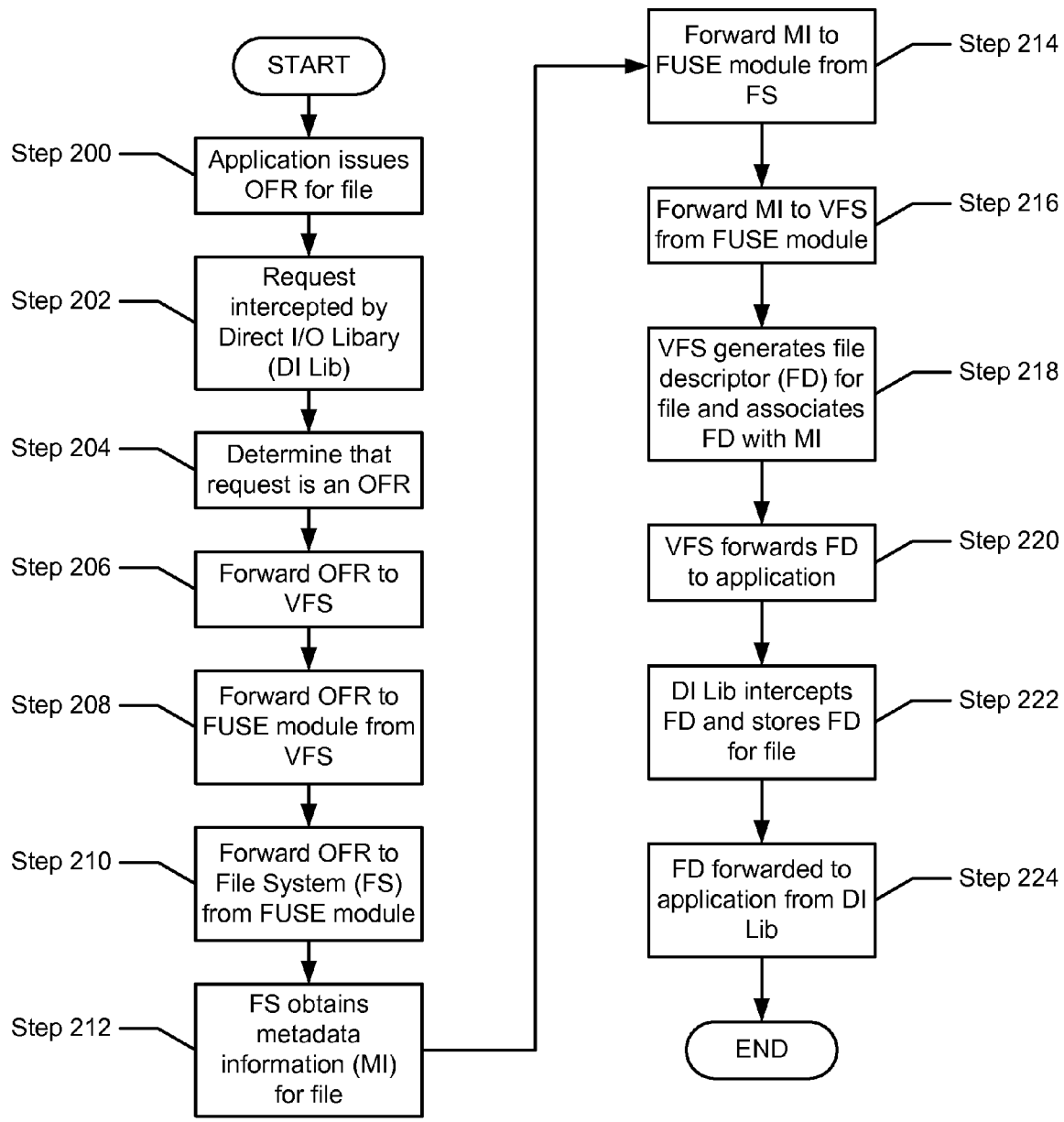
FIG. 2 shows a flowchart for processing an open file request (OFR) in accordance with one or more embodiments of the invention.

FIG. 2 shows a flowchart for processing an open file request (OFR) in accordance with one or more embodiments of the invention.

Turning to FIG. 2, in Step 200, the application issues an open file request (OFR) for a file. The OFR is the first operation that is performed by an application prior to a file operation request (FOR) being issued for the file. In Step 202, the DI Lib intercepts the OFR. At the time the DI Lib intercepts the request, the DI Lib may only know that a request was issued by the application but the DI Lib may not know what type of request it has intercepted.

In Step 204, the DI Lib determines the request is a OFR for a file. In Step 206, the DI Lib forwards the OFR to the VFS. In Step 208, the VFS receives and forwards the OFR to the FUSE module. In one embodiment of the invention, the VFS may include functionality to identify that the OFR is to be forwarded to the FUSE module (as opposed to another file system operating in the kernel-level). In Step 210, the FUSE module receives and forwards the OFR to the user-level file system (FS).

In Step 212, the FS receives the OFR for the file and performs the necessary actions (which may include issuing a read request to the storage device) to obtain meta data information (MI) for the file. In one embodiment, the MI for file includes all (or substantially all) information about the file except the file name and the content of the file. The MI may be obtained by the FS in the form of a vnode. Other data structures may be used to store/maintain the MI without departing from the invention. In Step 214, the FS forwards the MI for the file to the FUSE module. In Step 216, the FUSE module receives MI and subsequently sends the MI to the VFS.

In Step 218, the VFS receives the MI and generates a file descriptor (FD) for the file and associates the FD with the MI. In Step 220, VFS forwards the FD to the application (i.e., the application that sent the OFR). In Step 222, the DI Lib intercepts the FD and stores the FD for future use. In Step 224, the DI Lib forwards the FD to the application. At this stage the application can perform FORs on the file using the FD.

Figure 3:
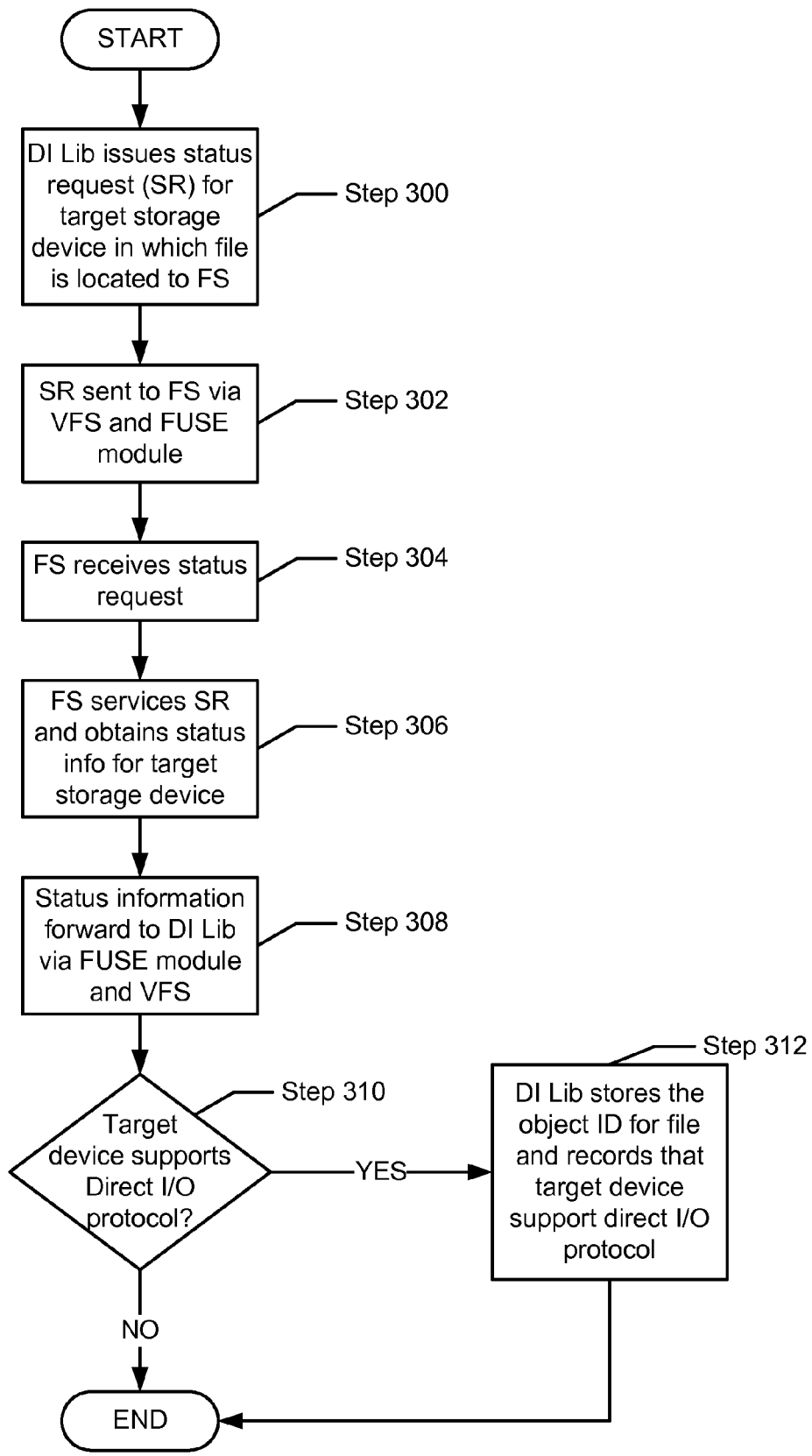
FIG. 3 shows a flowchart for processing a status request (SR) in accordance with one or more embodiments of the invention.

FIG. 3 shows a flowchart for processing a status request (SR) in accordance with one or more embodiments of the invention. Specifically, FIG. 3 may be performed in the event that the DI Lib stores a FD that it has not previously stored.

In Step 300, the DI library issues a status request (SR) to the user-level file system (FS) for the target storage device in which the file corresponding to the FD is located. One purpose of the SR is to determine whether the target storage device supports the direct I/O protocol. In Step 302, the SR is sent to the FS via the VFS and the FUSE module. In Step 304, the FS receives the SR.

In Step 306, the FS services the SR to obtain status information for the target storage device. In one embodiment of the invention, servicing the SR may include issuing a request to the storage device using the DI Lib. Alternatively, the FS may connect with the storage device using another library (or mechanism). In one embodiment of the invention, the status information may include, among other information, whether the storage device support the direct I/O protocol. In the event that the storage device supports the direct I/O protocol, the status information may also include an object ID for the file (i.e., the file corresponding to the FD that triggered the SR). Alternatively, the object ID for the file may be obtained separately from the status information in the event that the target storage device supports the direct I/O protocol.

In Step 308, the status information is forwarded to the DI Lib via the FUSE module and the VFS. In Step 310, the DI Lib receives the status information and determines whether the target storage device supports the direct I/O protocol. If the target storage device supports the direct I/O protocol, the process proceeds to Step 312; otherwise, the process ends. In Step 312, the DI Lib stores the object ID for the file and records that the target storage device supports the direct I/O protocol. In one embodiment of the invention, the storage of the object ID may itself provide an indication that the target storage device supports the direct I/O protocol. Said another way, if the FD is associated with an object ID, then the target storage device supports the direct I/O protocol; otherwise, the target storage device does not support the direct I/O protocol.

In one embodiment of the invention, the DI Lib may include functionality to determine whether the target storage device supports the direct I/O protocol by querying the data structure(s) it maintains about target storage devices from which it has previously requested status information. In such cases, if the DI Lib determines that the target storage device supports the direct I/O protocol, then DI Lib may only request the object ID from the FS; if the DI Lib determines that the target storage device does not support the direct I/O protocol, then no further action may be taken with respect to obtaining the object ID. However, if the DI Lib has no information about whether the target storage device supports the direct I/O protocol, then DI Lib may perform the steps in FIG. 3.

Figure 4A:
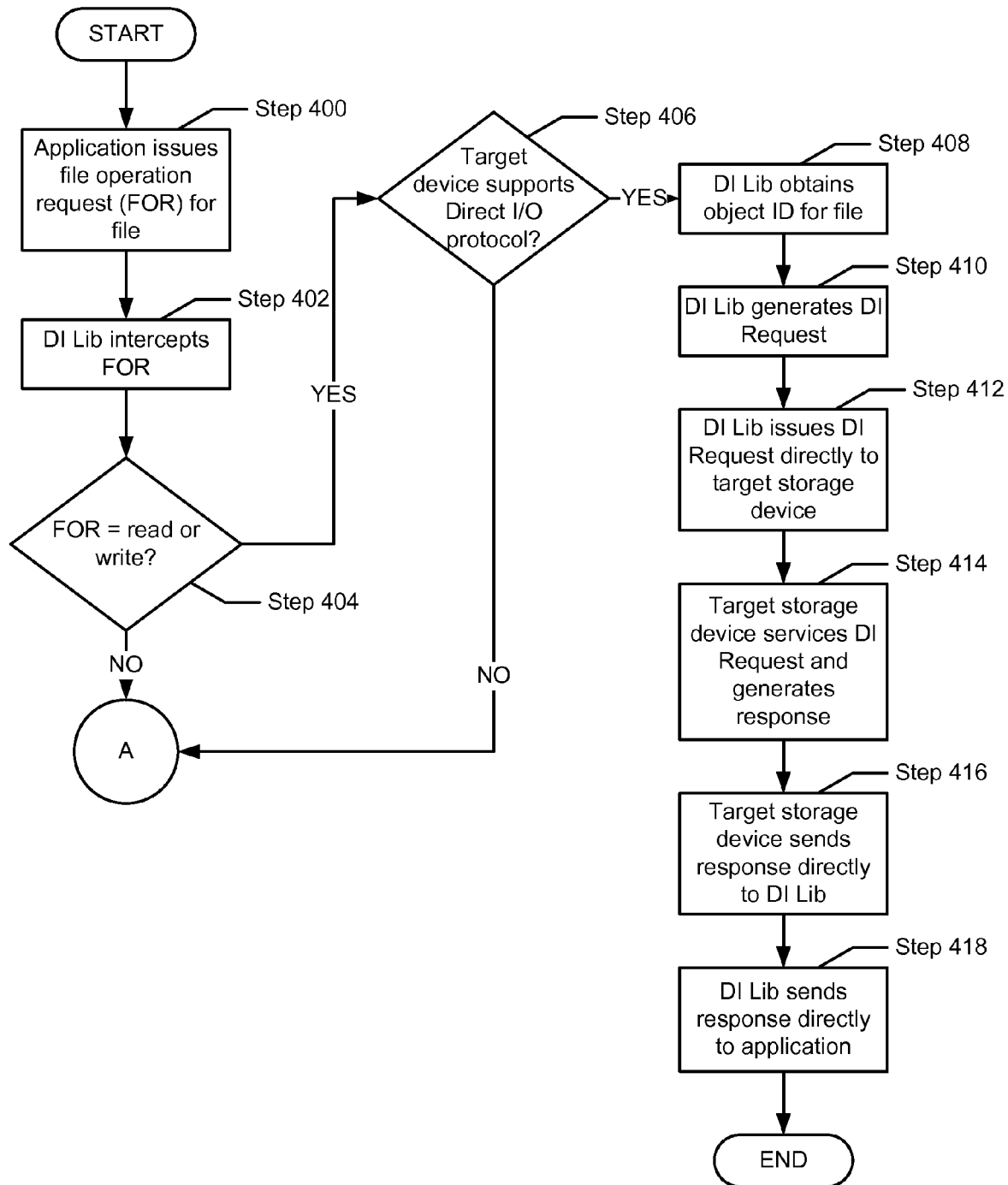
FIGS. 4A-4B show flowcharts for processing file operation requests (FOR) in accordance with one or more embodiments of the invention.
Figure 4B:
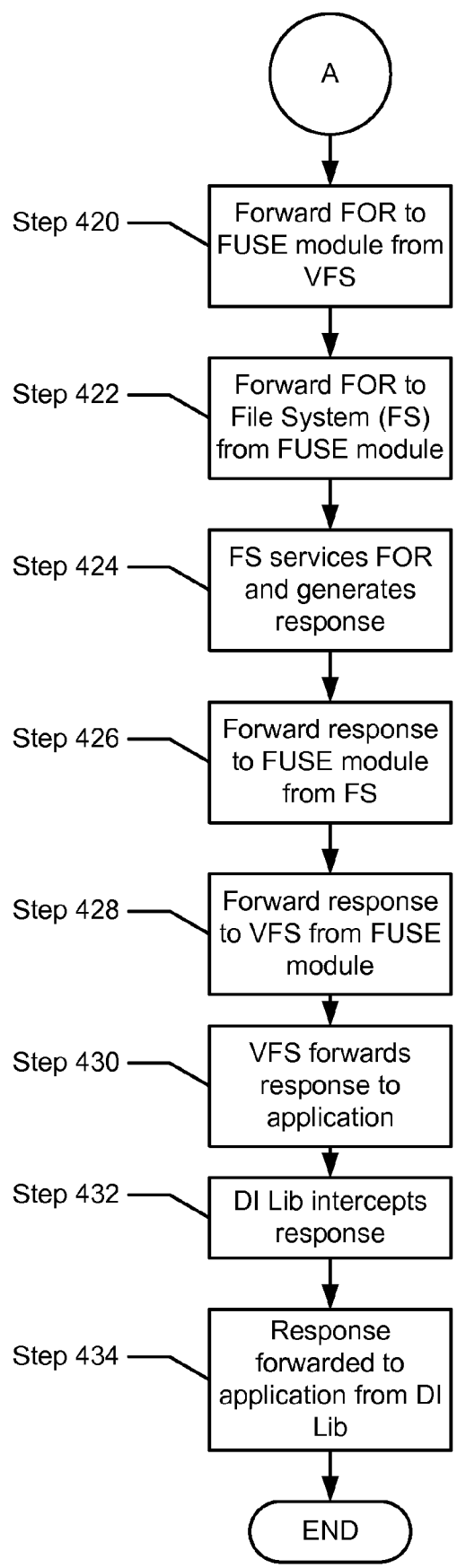

FIGS. 4A-4B show flowcharts for processing file operation requests (FOR) in accordance with one or more embodiments of the invention.

In Step 400, the application issues a file operation request (FOR) for a file. In one embodiment of the invention, the FOR may be, but is not limited to, a read request, a write request, a create file request, and a delete file request. The FOR may specify the FD for the file if the request is a read request or a write request. In Step 402, the DI Lib intercepts the FOR. In Step 404, a determination is made about whether the FOR is a read or write request. If the FOR is a read or write request, the process proceeds to step 406; otherwise DI Lib forwards the FOR to the VFS and the process proceeds to Step 420. In one embodiment of the invention, depending on the implementation of the invention, Step 404 may be extended to cover determining whether the FOR is any type of request that may be issued via a DI request.

In Step 406, a determination is made about whether the target storage device on which the file resides supports the direct I/O protocol. In one embodiment of the invention, this determination may be made by querying the data structure(s) maintained by the DI Lib to determine whether (i) there is an object ID associated with the FD and/or (ii) whether there is a record (or other data structure) indicating that that target storage device supports the direct I/O protocol. If the target storage device on which the file resides supports the direct I/O protocol, the process proceeds to Step 408; otherwise the DI Lib forwards the FOR to the VFS and the process proceeds to Step 420.

In Step 408, the DI Lib obtains the object ID for the file. In Step 410, the DI Lib generates a DI request that specifies the type of request (e.g., read or write), the object ID, the offset in the object, and any other relevant parameters.

In Step 412, the DI Lib issues the DI request directly to the storage device. In one embodiment of the invention, issuing the DI request includes storing the DI request directly into the appropriate submission queue in the memory of the target storage device. Step 412 does not require any interaction with the VFS, FUSE Module, or user-level file system. In Step 414, the target storage device services the DI request and generates a response.

In Step 416, the target storage device sends the response directly back to the DI Lib. For example, if the request is a read request, the target storage device may directly store the requested data in a memory location on the client that is part of the unified address space. In one embodiment of the invention, a notification that the DI request has been serviced is stored in a completion queue. Once the notification is stored in the completion queue, the client is notified, e.g., via an interrupt, that there is a notification in the completion queue. The client subsequently obtains and processes the notification. In Step 418, the DI Lib sends a response (which may include data retrieved by the target storage device if the FOR was a read request) to the application.

In Step 420, the VFS receives the FOR from the DI Lib and forwards the FOR to the FUSE Module. In Step 422, the FUSE module receives and forwards the FOR to the user-level file system (FS).

In Step 424, the FS services the FOR and generates a response. If the target storage device supports the direct I/O protocol but the FOR is not one of a read request or write request, then the FS may service the FOR by interacting with the target storage device using the DI Lib. Alternatively, if the target storage device does not support the direct I/O protocol, the FS may service the FOR using an other protocol supported by the target storage device.

In Step 426, the FS forwards the response to the FUSE module. In Step 428, the FUSE module receives a response and subsequently sends the response to the VFS. In Step 430, VFS forwards the response to the application (i.e., the application that sent the FOR). In Step 432, the DI Lib intercepts the response. In Step 434, the DI Lib forwards the response to the application.

One or more embodiments of the invention enable the storage device to concurrently service requests from the application (e.g., as described in FIG. 4A) and by the user-level file system (e.g., as described in FIG. 4B).

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor perform a method, the method comprising:
   intercepting, in a user-level of a host, an open file request (OFR) for a file issued by an application to a file system (FS);
   forwarding the OFR to the FS, wherein the FS is located in the user-level and the OFR is forwarded to the FS via a kernel module in a kernel-level of the host;
   receiving from the FS, in response to the OFR, a file descriptor (FD) for the file;
   issuing a status request (SR) for the file to the FS, wherein the SR comprises the file descriptor;
   receiving from the FS, in response to the SR, status information for a target device on which the file is located, wherein the status information comprises an object identified (OID) for the file, wherein the target device is external to the host;
   storing a mapping of FD to the OID;
   after storing the mapping of the FD to the OID:
      intercepting, by a direct I/O library, a first file operation request (FOR) for the file, wherein the request comprises the FD;
      making a first determination that the first FOR is one selected from a group consisting of a read request and a write request;
      based on the first determination, making a second determination that the target device on which the file is located supports the direct I/O protocol;
      issuing a direct I/O request to the target device using the OID for the file, wherein the direct I/O request is not processed by the FS;
      intercepting, by the direct I/O library, a second FOR for the file, wherein the second FOR comprises the FD;
      making a third determination that the second FOR is not one selected from a group consisting of the read request and the write request; and
      based on the third determination, forwarding the second FOR to the FS via the kernel module in the kernel-level of the host.

2. The non-transitory computer readable medium of claim 1, the method further comprising:
   receiving a notification, in response to the direct I/O request, that the direct I/O request is completed, wherein the notification is sent directly from the target device to the host and wherein the FS does not receive the notification.

3. The non-transitory computer readable medium of claim 1, the method further comprising:
   creating a unified address space comprising a memory location on the target device prior to the issuance of the direct I/O request,
   wherein issuing the direct I/O request comprises storing the direct I/O request directly in the memory location on the target device.

4. The non-transitory computer readable medium of claim 1, wherein issuing the direct I/O request to the target device comprises storing the direct I/O request in a memory location on the target storage device, wherein the memory location is part of a unified address space that is directly accessible by the host.

5. The non-transitory computer readable medium of claim 4, wherein the memory location is associated with a submission queue.

6. A system, comprising:
a processor;
a user-level comprising an application, a direct I/O library, and a file system (FS);
a virtual file system (VFS) in the kernel-level, wherein the VFS is interposed between the direct I/O library and the kernel module;
a kernel-level, executing on the processor, comprising a kernel module; and
wherein the application is configured to issue an open file request (OFR) for a file;
wherein the direct I/O library is configured to intercept the OFR and forward the OFR to the VFS;
wherein the VFS is configured to forward to the OFR to the kernel module;
wherein the kernel module is configured to forward the OFR to the FS;
wherein the FS is configured to obtain a file descriptor (FD) for the file and send the FD to the direct I/O library via the kernel module;
wherein the direct I/O library is further configured to issue a status request (SR) for the file to the FS, wherein the SR comprises the file descriptor;
wherein the FS is configured to receive, via the kernel module, the SR and generate status information for a target device on which the file is located, wherein the status information comprises an object identified (OID) for the file and specifies that the target device supports a direct I/O protocol, and send the status information to the direct I/O library via the kernel module;
wherein the direct I/O library is further configured to receive the status information and store a mapping of FD to the OID;
wherein the target device is operatively connected to the system; and
wherein the kernel module is a File system in USEr space (FUSE) module.

7. The system of claim 6, wherein the direct I/O library is further configured to:
after storing the mapping of the FD to the OID:
intercept a first file operation request (FOR) for the file, wherein the request comprises the FD;
make a first determination that the first FOR is one selected from a group consisting of a read request and a write request;
based on the first determination, make a second determination that the target device on which the file is located supports the direct I/O protocol; and
issue a direct I/O request to the target device using the OID for the file, wherein the direct I/O request is not processed by the FS and is not processed by the kernel module.

8. The system of claim 7, further comprising:
a kernel-level direct I/O library configured to create a unified address space comprising a memory location on the target device prior to the issuance of the direct I/O request, wherein issuing the direct I/O request comprises storing the direct I/O request directly in the memory location on the target device.

9. The system of claim 7, wherein the unified address is implemented using PCIe and a non-transparent bridge interposed between the system and the target device.

10. The system of claim 6, wherein the direct I/O library is further configured to:
after storing the mapping of the FD to the OID:
receive a second FOR for the file, wherein the second FOR comprises the FD;
make a third determination that the second FOR is not one selected from a group consisting of the read request and the write request;
based on the third determination, forward the second FOR to the FS via the kernel module.

11. The system of claim 10, wherein the second FOR is one selected from a group consisting of a modify operation and a delete operation.

12. The system of claim 10, wherein the FS is further configured to:
receive the second FOR;
service the second FOR using the direct I/O library to generate a response;
sending the response to the application via the kernel module and the direct I/O library.

13. The system of claim 6, wherein the target device comprises persistent storage.

14. The system of claim 13, wherein the persistent storage comprises a solid state memory device.

* * * * *